(12) United States Patent
Gerneth et al.

(10) Patent No.: US 11,095,015 B2
(45) Date of Patent: Aug. 17, 2021

(54) LOCKING OF A ROOF ANTENNA OF A VEHICLE BY MEANS OF A STAR WHEEL

(71) Applicant: Hirschmann Car Communication GmbH, Neckartenzlingen (DE)

(72) Inventors: Christian Gerneth, Kirchentellinsfurt (DE); Ralf Amler, Großbettlingen (DE)

(73) Assignee: Hirshmann Car Communication GmbH, Neckartenzlingen (DE)

( * ) Notice: Subject to any disclaimer, the term of this patent is extended or adjusted under 35 U.S.C. 154(b) by 252 days.

(21) Appl. No.: 16/277,015

(22) Filed: Feb. 15, 2019

(65) Prior Publication Data

US 2019/0198968 A1    Jun. 27, 2019

Related U.S. Application Data

(63) Continuation of application No. PCT/EP2017/070609, filed on Aug. 14, 2017.

(30) Foreign Application Priority Data

Aug. 15, 2016 (DE) .................... 10 2016 115 087.8

(51) Int. Cl.
    *H01Q 1/32*      (2006.01)
    *H01Q 1/12*      (2006.01)
    *F16B 41/00*      (2006.01)
    *H01Q 1/42*      (2006.01)

(52) U.S. Cl.
    CPC ......... *H01Q 1/1214* (2013.01); *F16B 41/002* (2013.01); *H01Q 1/3275* (2013.01); *H01Q 1/42* (2013.01)

(58) Field of Classification Search
CPC ...... H01Q 1/1214; H01Q 1/42; H01Q 1/3275; H01Q 1/122; F16B 41/002
See application file for complete search history.

(56) References Cited

U.S. PATENT DOCUMENTS

| 7,436,367 | B2 | 10/2008 | Blickle |
| 9,608,315 | B2 | 3/2017 | Gerneth |
| 2006/0077110 | A1 | 4/2006 | Blickle |
| 2014/0043193 | A1 | 2/2014 | Gerneth et al. |

FOREIGN PATENT DOCUMENTS

| CN | 2799957 Y | 7/2006 |
| CN | 201170244 Y | 12/2008 |
| CN | 103503230 A | 1/2014 |
| CN | 204776049 U | 11/2015 |
| DE | 10 2005 041 473 A1 | 3/2006 |

(Continued)

OTHER PUBLICATIONS

Abstract of DE102012202677, dated Aug. 23, 2012, 1 page.

(Continued)

*Primary Examiner* — Dieu Hien T Duong
(74) *Attorney, Agent, or Firm* — Barley Snyder (57) ABSTRACT

A roof antenna for mounting on a roof of a vehicle comprises a base plate, an antenna cap connected to the base plate, a circuit board disposed under the antenna cap and having a plurality of antenna elements and a plug connection, a central dome connected to the base plate and having a screw thread, a star wheel interacting with the central dome, and a first O-ring secured on the central dome. The first O-ring fixes the central dome movably with respect to the star wheel and/or the base plate.

15 Claims, 7 Drawing Sheets

(56) References Cited

FOREIGN PATENT DOCUMENTS

| | | |
|---|---|---|
| DE | 10 2005 044 610 A1 | 3/2006 |
| DE | 10 2005 044 611 A1 | 3/2006 |
| DE | 102007008372 A1 | 8/2007 |
| DE | 202007014325 U1 | 12/2007 |
| DE | 102012202677 A1 | 8/2012 |
| DE | 102012207438 A1 | 11/2012 |
| EP | 2048384 A2 | 4/2009 |
| JP | 2000199513 | 7/2000 |
| JP | 2012167716 A | 9/2012 |

OTHER PUBLICATIONS

PCT International Search Report and Written Opinion, Application No. PCT/EP2017/070609, dated Oct. 26, 2017, 11 pages.
Abstract of DE102007008372, dated Aug. 23, 2007, 1 page.
Abstract of EP2048384, dated Apr. 15, 2009, 1 page.
Abstract of DE 10 2005 041 473 A1, dated Mar. 23, 2006, 1 page.
Korean Office Action, dated May 28, 2020, 4 pages.
Chinese Office Action, dated May 18, 2020, 9 pages.
Abstract of EP2048384, related to DE 202007014325, dated Apr. 15, 2009, 1 page.
Abstract of CN2799957, dated Jul. 26, 2006, 1 page.
Abstract of CN201170244, dated Dec. 24, 2008, 1 page.
Abstract of CN204776049, dated Nov. 18, 2015, 1 page.
Abstract of JP 2000199513, dated Jul. 18, 2000, 1 page.
Abstract of JP 2012167716, dated Sep. 6, 2012, 1 page.

LOCKING OF A ROOF ANTENNA OF A VEHICLE BY MEANS OF A STAR WHEEL

CROSS-REFERENCE TO RELATED APPLICATIONS

This application is a continuation of PCT International Application No. PCT/EP2017/070609, filed on Aug. 14, 2017, which claims priority under 35 U.S.C. § 119 to German Patent Application No. 102016115087.8, filed on Aug. 15, 2016.

FIELD OF THE INVENTION

The present invention relates to an antenna and, more particularly, to a roof antenna adapted to be mounted on a roof of a vehicle.

BACKGROUND

A roof antenna and a method for mounting the roof antenna on a roof of a vehicle are known, for example, from DE 102005041473 A1, DE 102005044610 A1, and DE 102005044611 A1.

A roof antenna for mounting on a roof of a vehicle is disclosed in DE 102012202677, the roof antenna having a base plate and an antenna cap which can be connected to the base plate. A circuit board with antenna elements and at least one plug connection is arranged under the antenna cap. In order to simplify the mounting, after the roof antenna has been directed via its fastening region vertically downwards through an opening in the roof of the vehicle, locking devices pre-fix the roof antenna on the roof. After the roof antenna is in a pre-mounting position, fastening devices are actuated to secure the roof antenna permanently, sealingly, in a manner secured against loss and immovably at the desired location on the roof of the vehicle.

A roof antenna for mounting on a roof of a vehicle is disclosed in DE 102012207438, the roof antenna having a base plate and an antenna cap connected to the base plate. A circuit board with antenna elements and at least one plug connection is arranged under the antenna cap. The base plate has fastening devices for a final mounting. The fastening devices are a central dome with screw thread and a star wheel which interacts with the dome. The dome with screw thread and the star wheel are intended to interact but are formed as components which are separate from each other. Consequently, there is the danger that these two components, during a pre-mounting somewhere other than the installation site or at the installation site, are not available at the same time or that at least one of the components or even both components is/are lost after a pre-mounting during transportation to the installation site on the vehicle. The pre-mounting, for example, may be carried out by a manufacturer of the roof antenna.

SUMMARY

A roof antenna for mounting on a roof of a vehicle comprises a base plate, an antenna cap connected to the base plate, a circuit board disposed under the antenna cap and having a plurality of antenna elements and a plug connection, a central dome connected to the base plate and having a screw thread, a star wheel interacting with the central dome, and a first O-ring secured on the central dome. The first O-ring fixes the central dome movably with respect to the star wheel and/or the base plate.

BRIEF DESCRIPTION OF THE DRAWINGS

The invention will now be described by way of example with reference to the accompanying Figures, of which.

DETAILED DESCRIPTION OF THE EMBODIMENT(S)

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein. Rather, these embodiments are provided so that the present disclosure will convey the concept of the disclosure to those skilled in the art.

Figure 1A:
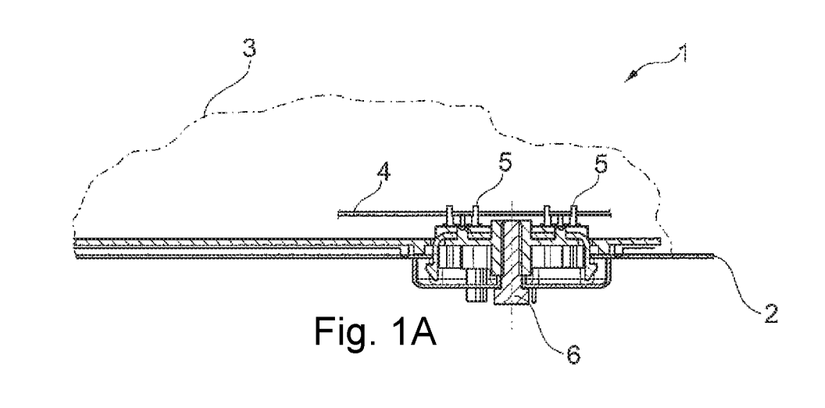
FIG. 1A is a sectional side view of a roof antenna according to an embodiment.
Figure 1B:
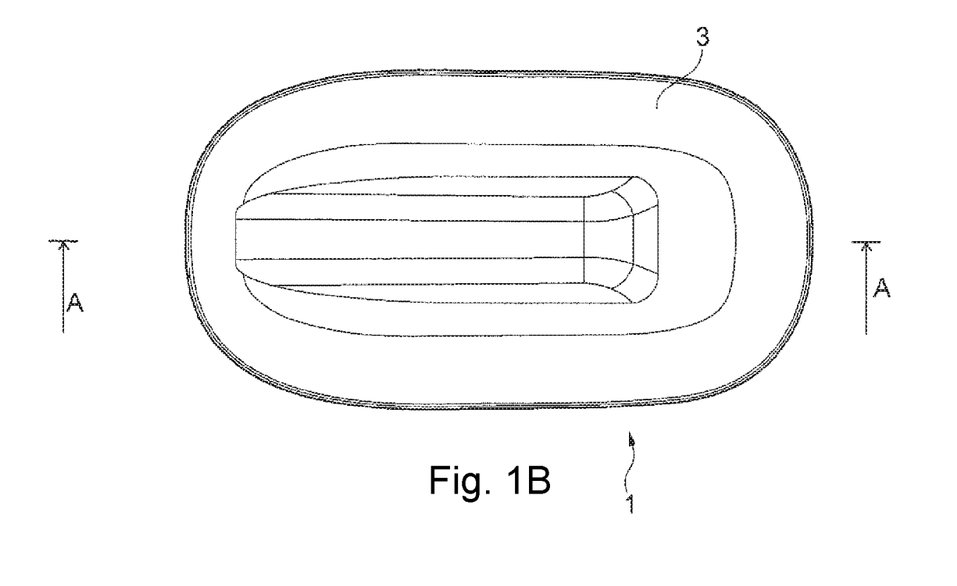
FIG. 1B is a top plan view of the roof antenna.

A roof antenna 1 for mounting on a roof 2 of a vehicle is shown in FIGS. 1A and 1B. The roof antenna 1 comprises an antenna cap 3 and a circuit board 4 with antenna elements, for example for telephone, GPS, TV and the like, is disposed under the antenna cap 3. The circuit board 4 can have plug connections 5 which point vertically downwards. In other embodiments, the circuit board 4 can have just one plug connection 5 or no plug connections 5. The antenna elements arranged under the antenna cap 3 can be connected to downstream electronic devices via, for example, cables.

Figure 2:
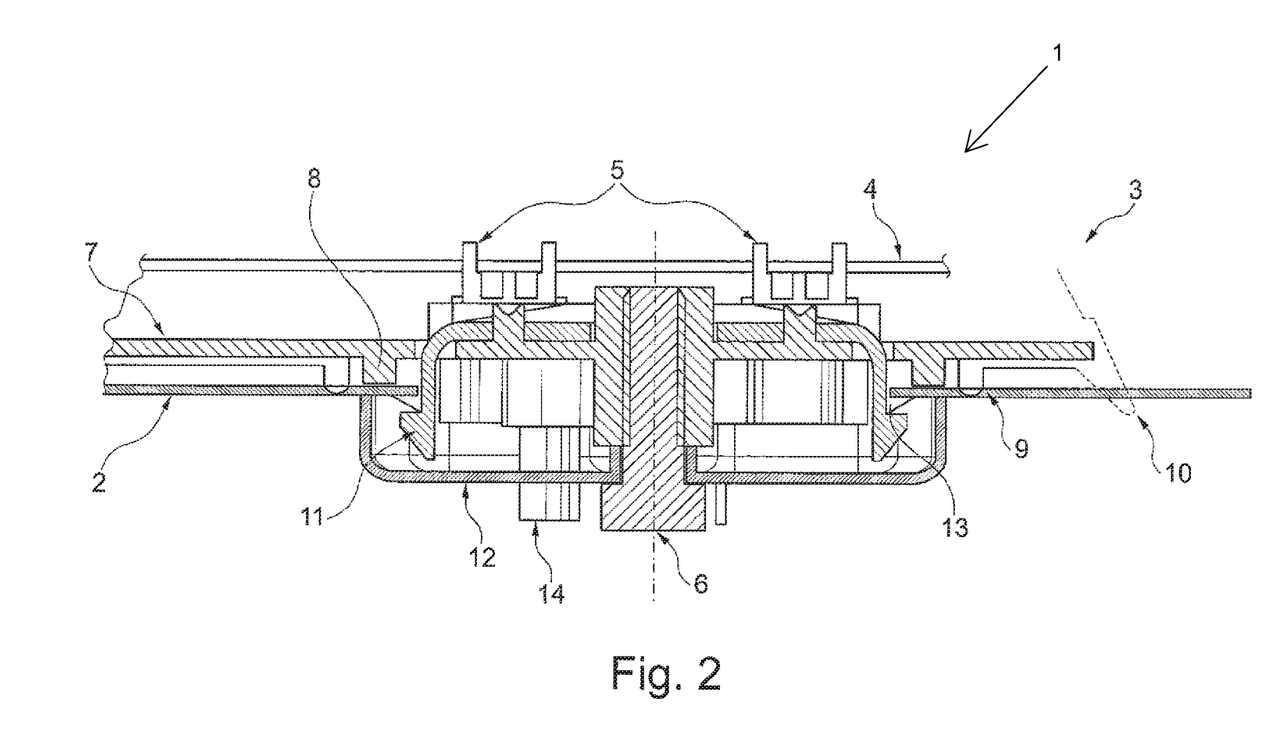
FIG. 2 is a sectional side view of the roof antenna.

The roof antenna 1, as shown in FIG. 2, comprises a base plate 7 having downwardly pointing counter bearings 8. In the shown embodiment, a distance between a lower side of the base plate 7 and an upper side of the roof 2 is defined using the counter bearings 8. The counter bearings 8 can be formed in a radially circumferential manner, for example. In another embodiment, the counter bearings 8 can be omitted. The roof antenna 1 has an inner seal 9 arranged between the lower side of the base plate 7 and the upper side of the roof 2. The inner seal 9 is also radially circumferential to form a seal between the outer region around the roof antenna 1 and the inner region of the vehicle. Alternatively or in addition to the inner seal 9, the roof antenna 1 has an outer seal 10 forming a seal between the circumferential lower edge of the antenna cap 3 and the upper side of the roof 2.

The roof antenna 1 comprises a central dome 6 connected to the base plate 7 and having a screw thread. In an embodiment, the central dome 6 is a screw. In order to pre-fix the roof antenna 1 on the roof 2, the roof antenna 1 has a plurality of locking hooks 11 shown in FIG. 2. In order to fully mount the roof antenna 1 on the roof 2, a star wheel 12 is located on the screw thread of the central dome 6 and interacts with the central dome 6. In the embodiment shown in FIG. 2, the roof antenna 1 has been secured in its mounted position on the roof 2.

The roof antenna 1 is guided from above the roof 2 via its fastening region through a roof opening 13 in the roof 2. The locking hooks 11 engage the roof 2 in a pre-mounting position of the roof antenna 1 on the roof 2 and the central dome 6 protrudes into the interior space of the vehicle. If the counter bearings 8 are present, then their axial height is selected, or the length of the downwardly pointing locking hooks 11 is likewise selected, such that the locking hooks 11 engage with the lower side of the roof 2 before the lower side of the counter bearings 8 bear on the upper side of the roof 2.

The star wheel 12 is actuated and the roof antenna 1 is secured safely, permanently and non-displaceably, but optionally releasably, in the mounted position on the roof 2 of the vehicle shown in FIG. 2 only after the roof antenna 1 has reached the pre-mounting position, in which it has already been non-displaceably secured on the roof 2. The roof antenna 1 has at least one stop 14 described in greater detail below and shown in FIG. 2.

Figure 3A:
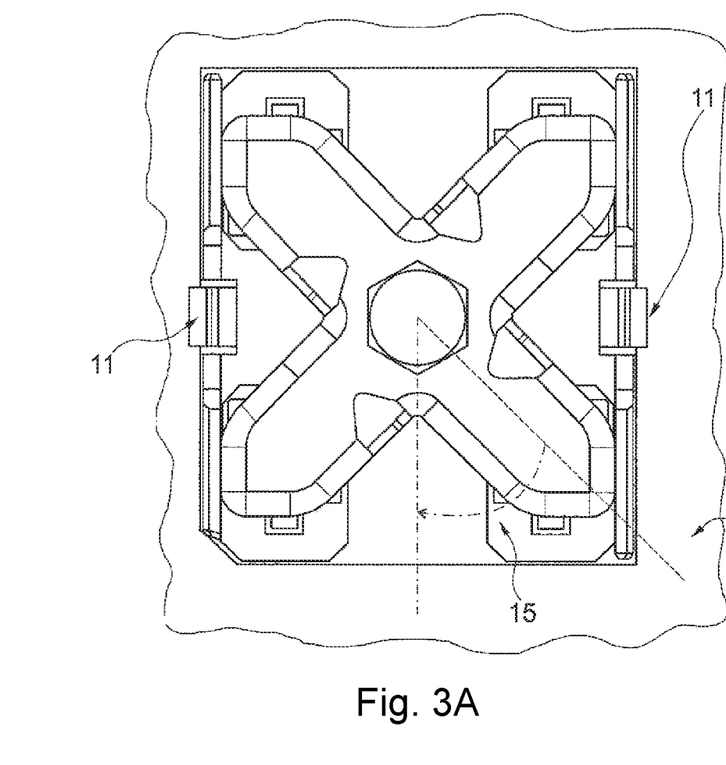
FIG. 3A is a bottom plan view of the roof antenna in a pre-mounting position.
Figure 3B:
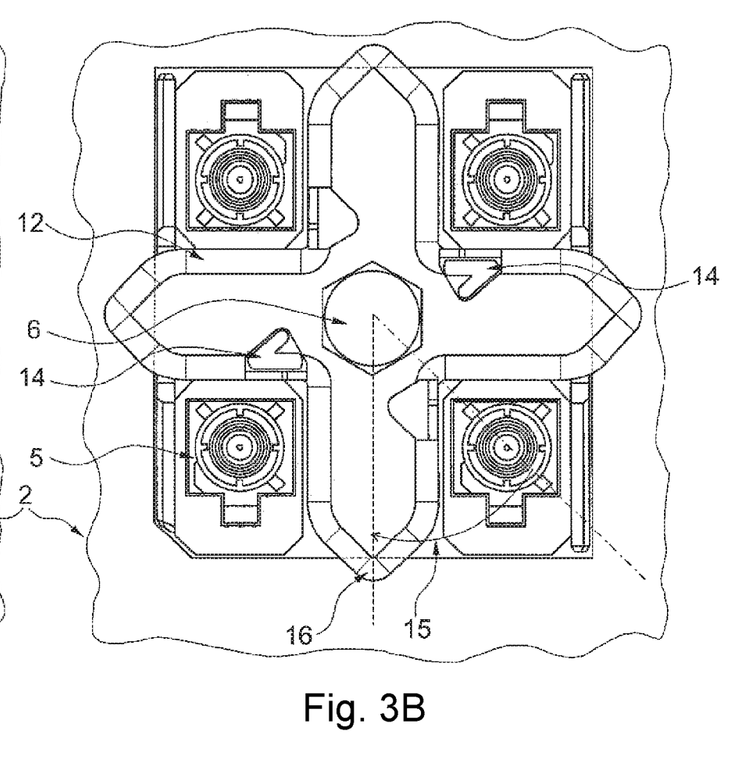
FIG. 3B is a bottom plan view of the roof antenna in a final mounted position.
Figure 4A:
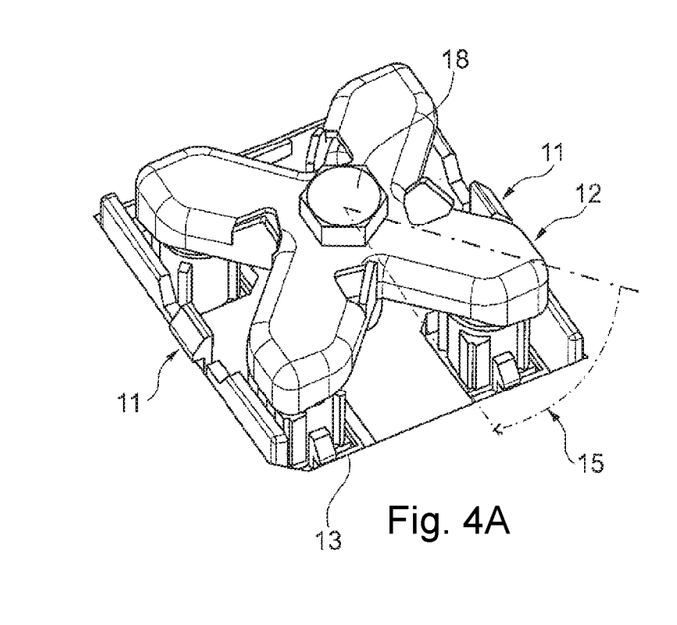
FIG. 4A is a bottom perspective view of the roof antenna in the pre-mounting position.
Figure 4B:
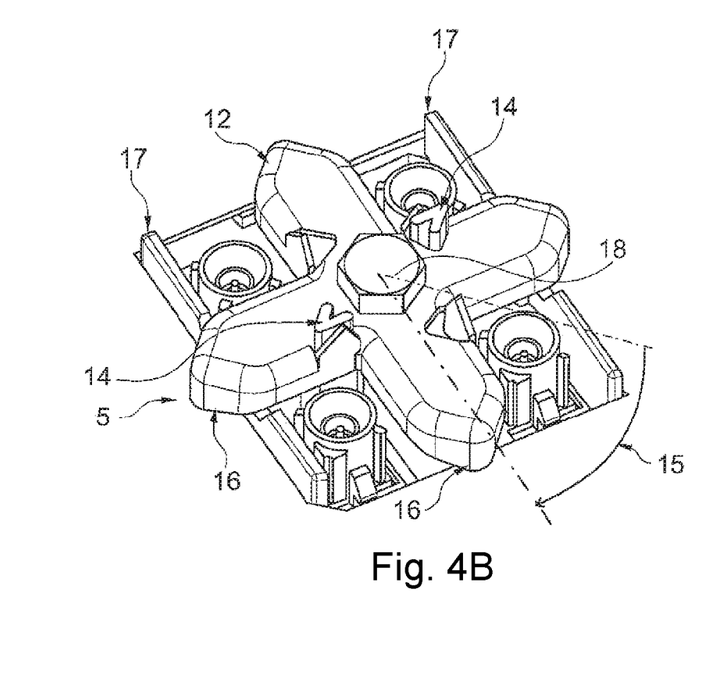
FIG. 4B is a bottom perspective view of the roof antenna in the final mounted position.

The pre-mounting position, also referred to as the delivery position, of the roof antenna 1 is shown in FIGS. 3A and 4A and the final mounted position of the roof antenna 1 on the roof 2 is shown in FIGS. 3B and 4B.

The stops 14 shown in FIGS. 3A-4B limit a rotation angle 15 of the star wheel 12. From the delivery position, the star wheel 12 cannot be twisted counterclockwise. Twisting of the star wheel 12 is only possible by rotating the star wheel 12 clockwise around the central dome 6. This rotational movement can take place until the an arm of the star wheel 12 bears on an opposing stop 14. In the shown embodiment, the rotation angle 15 of the star wheel 12 is a maximum of 45 degrees when it moves from the pre-mounting position into the final mounted position. If the stops 14 are not present or only one single stop 14 is present, for example, the rotation angle 15 of the star wheel 12 can of course be greater. It can also be smaller than 45 degrees and also more than one rotation. If more than one rotation of the star wheel 12 is effected around the central dome 6, greater tolerances or different roof thicknesses can be compensated.

The force with which the base plate 7 of the roof antenna 1 comes to bear on the roof 2 can be adjusted very accurately by way of the rotational movement of the star wheel 12. When the seal 9 is arranged between the lower side of the base plate 7 and the upper surface of the roof 2, the seal 9 can exert its sealing action optimally. Tolerances, in particular different thicknesses of the roof 2, can also easily be compensated.

As shown in FIGS. 3A-4B, each of the arms of the star wheel 12 has an end 16. The star wheel 12 is guided via the end 16 of its arms through the roof opening 13, and the ends 16 of the arms of the star wheel 12 engage the lower side of the roof 2 after it has been twisted. With the star wheel 12 in the final mounted position, the roof antenna 1 is secured permanently on the roof 2 of the vehicle. In an embodiment, the ends 16 of the star wheel 12 are beveled at their side surface and/or upper surface facing the lower side of the roof 2. In another embodiment, the upper surface of the star wheel 12 has mandrels, webs, or the like. In an embodiment, the star wheel 12 and the central dome 6 are each formed of an electrically conductive material and can serve for the ground connection of the roof antenna 1 if the vehicle roof 2 is also metallic. In the shown embodiment, the star wheel 12 has exactly four arms arranged at right angles to each other.

At least one guide rib 17, and a plurality of mutually opposing guide ribs 17 in the shown embodiment, extend from the base plate 7 and are shown in FIGS. 3 and 4. The location of the guide ribs 17 on the base plate 7 and the length of the guide ribs 17 corresponds to the geometry of the roof opening 13, so that the roof antenna 1 can be secured and aligned in its intended position on the roof 2. In the shown embodiment, the geometry (cutout) of the roof opening 13 and the geometry of the guide ribs (arrangement, length and the like) are selected such that the roof antenna 1 can be guided through the roof opening 13, pre-fixed, and finally fixed only in a single intended position and orientation.

The star wheel 12 covers the plug connection 5 in the pre-mounting position, shown in FIGS. 3A and 4A, and uncovers the plug connection 5 or the exactly four plug connectors 5 in the final mounting position shown in FIGS. 3B and 4B. The star wheel 12 is configured to be actuated by hand without tools. In order to further simplify the mounting, in another embodiment, the star wheel 12 has a hexagonal projection 18 for actuation by a tool. Moreover, a device for arresting the star wheel 12 in the pre-mounting position is present; the arms of the star wheel 12 cover the respective plug connection 5 as long as the roof antenna 1 has not yet been mounted on the roof 2 of the vehicle.

Figure 5:
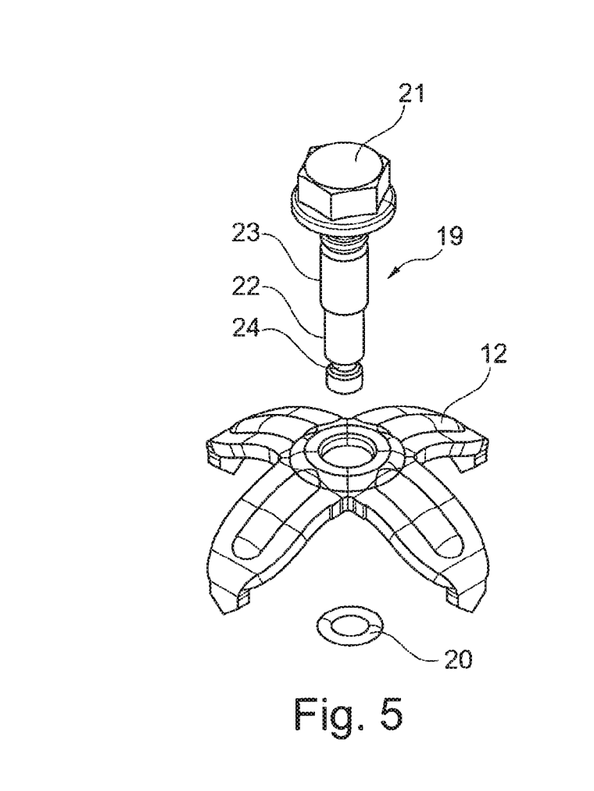
FIG. 5 is an exploded perspective view of a screw and a star wheel of the roof antenna.

As shown in FIG. 5, the central dome 6 is formed as a screw 19 interacting with the star wheel 12, and a first O-ring 20 is used as a shape-elastic element. The screw 19 has a screw head 21, which is hexagonal in shape for example, as depicted. The screw 19 has a non-threaded section 22 and a threaded section 23. At an end away from the screw head 21, a first circumferential groove 24 is provided into which the first O-ring 20 is inserted. This first O-ring 20, which is inserted into the groove 24, interacts with the base plate 7.

Figure 6:
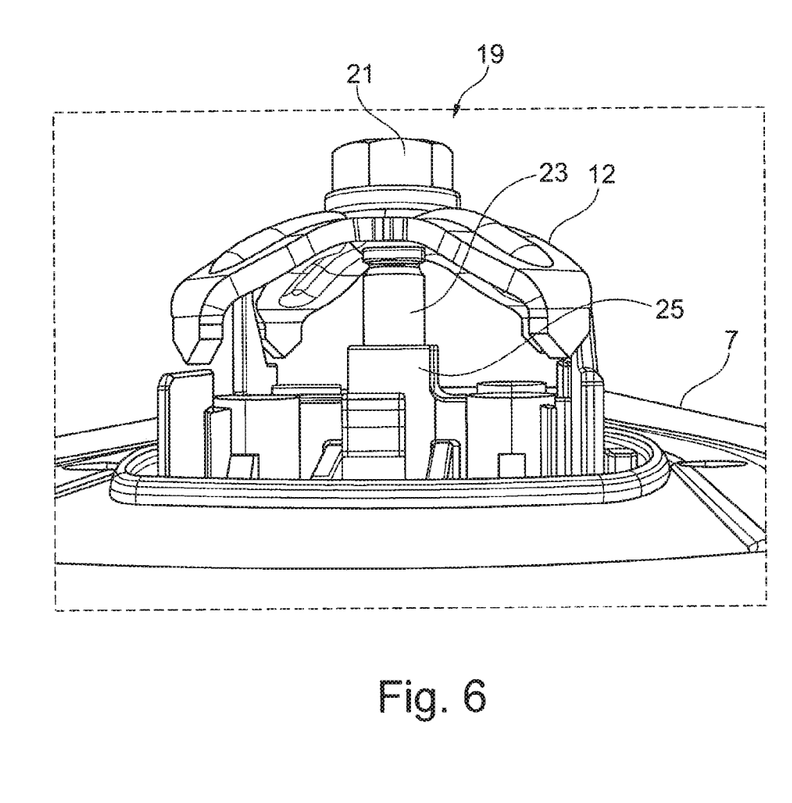
FIG. 6 is a side view of the screw and the star wheel in the pre-mounting position on a base plate of the roof antenna.

The screw 19 and the star wheel 12 are shown in the pre-mounting position on the base plate 7 in FIG. 6. The base plate 7 has a cylindrical section 25 formed either integrally with the base plate 7 or as a separate component, which is arranged on the base plate 7. The screw 19 is inserted, with the first O-ring 20 and also with the non-threaded section 22, into the base plate 7, in particular into its cylindrical section 25. In this position, the screw 19, together with the star wheel 12, is held in a manner secured against loss on the base plate 7 by a form fit via the first O-ring 20. This can be accomplished particularly simply, since only the screw 19 with the first O-ring 20 has to be pushed into the cylindrical section 25. The first O-ring 20 fixes the screw 19 movably with respect to the star wheel 12 and/or the base plate 7. The screw 19 may be screwed into the cylindrical section 25 by a rotational movement, so that a small part of an outer thread of the threaded section 23 engages an inner thread of the cylindrical section 25.

Figure 7:
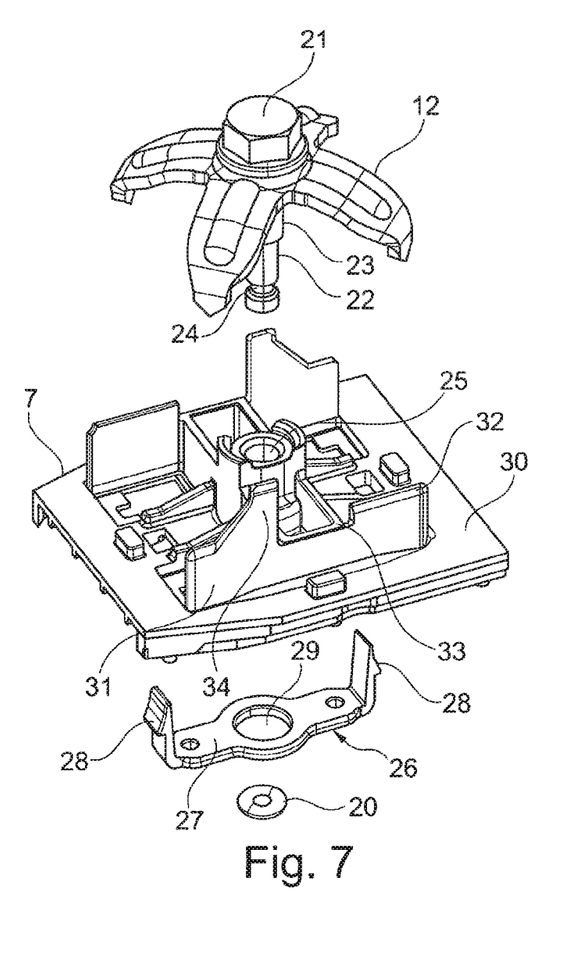
FIG. 7 is an exploded perspective view of a roof antenna according to another embodiment.
Figure 8:
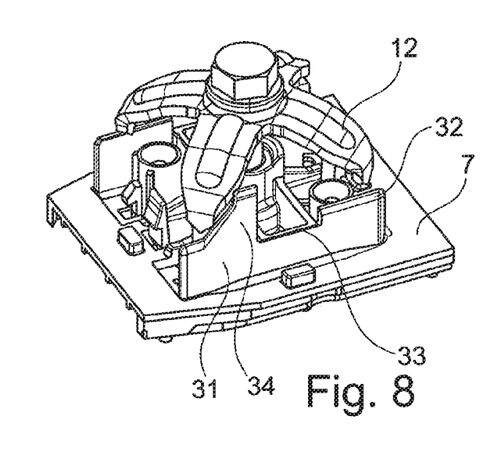
FIG. 8 is a perspective view of the roof antenna of FIG. 7 in the pre-mounting position.
Figure 9:
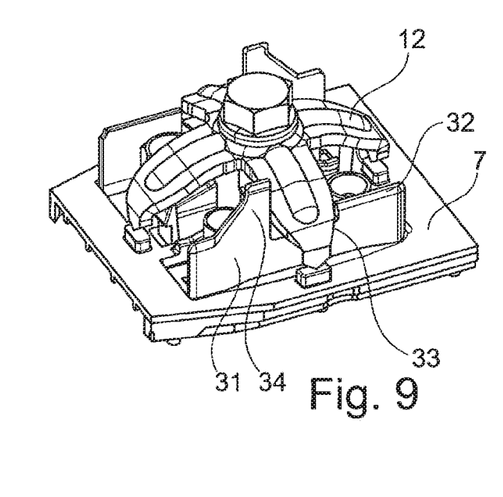
FIG. 9 is a perspective view of the roof antenna of FIG. 7 in the final mounted position.

In an embodiment shown in FIG. 7, a pre-fixing of the base plate 7 on the roof 2 is accomplished by an independent component, a locking device 26, instead of the locking hooks 11. The locking device 26 has a roughly elongated carrier 27, on the ends of which bent locking hooks 28 are arranged. An opening 29 receiving and guiding the screw 19 is disposed in the middle of the carrier 27. In the embodiment shown in FIG. 7, the base plate 7 has a limiting area 31 as a web-like structure extending from a base area 30. In the embodiment shown in FIG. 7, two limiting areas 31 are identical and extend parallel to each other. The limiting area 31 has a bearing edge 32, a cutout 33, and a stop 34. This configuration and function of the limiting area 31 is explained in greater detail below with reference to FIGS. 8 and 9; FIG. 8 shows the pre-mounting position and FIG. 9 shows the final mounting position.

In the pre-mounting position of FIG. 8, the unit, consisting of the screw 19 and the star wheel 12, has been inserted into the cylindrical projection 25 of the base plate 7. In this state, the arm or arms of the star wheel 12 lie with a pointed end of the arm on the bearing edge 32 of the limiting area 31. As a result, a defined location of this unit is established in relation to the base plate 7. By virtue of the alignment of this unit in relation to the base plate 7, it is possible to insert the base plate 7 through the opening in the roof 2 of the vehicle. When this occurs, the locking hooks 28 pre-fix the roof antenna 1.

If the roof antenna 1 has been inserted through the opening in the roof 2 of the vehicle as described above, with or without pre-fixing, the star wheel 12 can be twisted through a certain angle by actuating the screw 19, for example, with a suitable tool placed onto the screw head 21. An angle of rotation of the star wheel 12 is shown by comparison of FIGS. 8 and 9. In an embodiment, this angle is smaller than 45°. The twisting allows the outer ends of the arms of the star wheel 12 to cover the lower side of the roof 2. By the actuation of the screw 19, not only is the star wheel 12 twisted until the respective arm of the star wheel 12 comes to bear on the stop 34 of the limiting area 31, but also the screw 12 with its threaded section 23 is screwed further into the cylindrical projection 25. The actuation of the screw 19 thus effects not only a rotation of the star wheel 12, but also an axial movement of the star wheel 12 in the direction of the base area 30 of the base plate 7, after the arm of the star wheel 12 has not only come to bear on the stop 34, but also is located in the region of the cutout 33 of the limiting area 31.

By this axial movement of the star wheel 12, the entire roof antenna 1 is secured on the roof 2 of the vehicle. The base area 30 of the base plate 7 first lies on the upper surface of the roof 2 and the end regions of the arms of the star wheel 12 bear against the lower side of the roof 2 from the other side. As a result, the roof antenna 1 is secured permanently in its final mounting position on the roof 2 of the vehicle. If the base plate 7 is configured correspondingly, the first O-ring 20 also remains in this region in the final mounting position, and thus effectively and permanently prevents twisting, in particular loosening, of the screw 19. Moreover, the location of the arms of the star wheel 12 within the cutout 33 of the limiting area 31 prevents twisting of the star wheel 12 in its final position.

Figure 10:
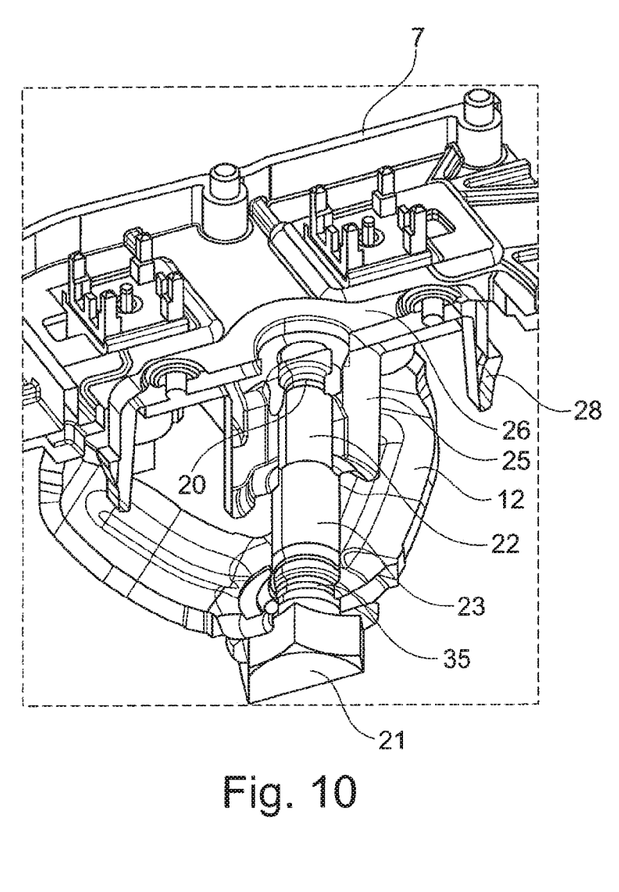
FIG. 10 is a sectional perspective view of a screw and a base plate of the roof antenna of FIG. 7.
Figure 11:
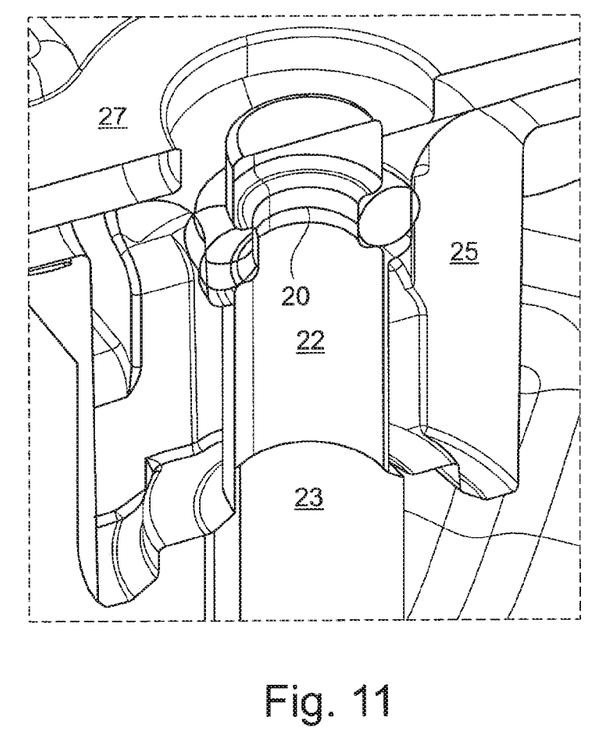
FIG. 11 is a detailed sectional perspective view of the screw and the base plate of the roof antenna of FIG. 7.

An inner contour of the base plate 7 interacting with the screw 19 is shown in FIGS. 10 and 11. The base plate 7 has the cylindrical projection 25. In another embodiment, instead of the projection 25, the base plate 7 can optionally also be configured geometrically differently for the same function. The pre-mounting position of the screw 19 with the first O-ring 20 is shown in FIGS. 10 and 11. The first O-ring 20 lies on a corresponding inner contour of the base plate 7, more precisely on the inner contour of the cylindrical projection 25, and produces the desired form fit there. The base plate 7 has a corresponding inner contour, for example a counterbore, a circumferential groove or the like, in the region of the cylindrical projection 25.

As shown in FIG. 10, the screw 19 carries not only the first O-ring 20, arranged at the end of the non-threaded section 22, but a second circumferential groove is also provided underneath the screw head 21 into which groove a second O-ring 35 is inserted. The second O-ring 35 is located between the screw head 21 and one end of the threaded section 23 and fixes the relative positions of the screw 19 and star wheel 12 by a form fit. The second O-ring 35 secures the screw 19 on the star wheel 12 after the final mounting position has been reached, in order to prevent the screw 19 from loosening.

What is claimed is:

1. A roof antenna for mounting on a roof of a vehicle, comprising:
    a base plate;
    an antenna cap connected to the base plate;
    a circuit board disposed under the antenna cap and having a plurality of antenna elements and a plug connection;
    a central dome connected to the base plate, the central dome is a screw having a screw head, a first circumferential groove disposed in the screw at an end opposite the screw head, and a screw thread between the screw head and the first circumferential groove along the screw;
    a star wheel interacting with the central dome; and
    a first O-ring secured on the central dome and fixing the central dome movably with respect to the star wheel and/or the base plate, the first O-ring is disposed in the first circumferential groove.

2. The roof antenna of claim 1, wherein the screw has a second circumferential groove disposed adjacent the screw head.

3. The roof antenna of claim 2, further comprising a second O-ring disposed in the second circumferential groove.

4. The roof antenna of claim 1, wherein the base plate has a counterbore receiving the first O-ring in a pre-mounting position of the screw and the star wheel in relation to the base plate.

5. The roof antenna of claim 1, wherein the star wheel has a plurality of ends guided vertically through a roof opening of the roof in a pre-mounting position.

6. The roof antenna of claim 5, wherein the ends of the star wheel engage a lower side of the roof in a final mounting position.

7. The roof antenna of claim 1, wherein the base plate has a stop limiting a rotation angle of the star wheel.

8. The roof antenna of claim 1, wherein the base plate has a guide rib.

9. The roof antenna of claim 1, wherein the star wheel covers the plug connection in a pre-mounting position.

10. The roof antenna of claim 9, wherein the star wheel uncovers the plug connection in a final mounting position.

11. The roof antenna of claim 1, wherein the star wheel has a rotation angle between a pre-mounting position and a final mounting position.

12. The roof antenna of claim 11, wherein the rotation angle is a maximum of 45 degrees.

13. The roof antenna of claim 11, wherein the rotation angle of the star wheel is limited by a counter bearing disposed on the base plate and abutting an upper surface of the roof.

14. The roof antenna of claim 1, wherein the star wheel has a hexagonal projection capable of being actuated by a tool.

15. The roof antenna of claim 1, wherein the star wheel has exactly four arms arranged at right angles to each other.

\* \* \* \* \*